US009464706B2

(12) United States Patent
Oberle et al.

(10) Patent No.: US 9,464,706 B2
(45) Date of Patent: Oct. 11, 2016

(54) SHAFT WITH A GEAR CAST ON ITS FRONT SIDE AND METHOD FOR PRODUCING SUCH A SHAFT

(75) Inventors: Stephan Oberle, Villingen (DE); Bernd Schilling, Klettgau (DE); Uwe Probst, Orsingen-Nenzingen (DE); Markus Bernhard, Nenzingen (DE)

(73) Assignee: IMS GEAR GMBH, Donaueschingen (DE)

( * ) Notice: Subject to any disclaimer, the term of this patent is extended or adjusted under 35 U.S.C. 154(b) by 74 days.

(21) Appl. No.: 13/070,083

(22) Filed: Mar. 23, 2011

(65) Prior Publication Data
US 2011/0259136 A1 Oct. 27, 2011

(30) Foreign Application Priority Data
Apr. 22, 2010 (DE) .................. 10 2010 018 079

(51) Int. Cl.
*F16H 55/17* (2006.01)
*F16H 55/06* (2006.01)
*B29C 45/00* (2006.01)
(Continued)

(52) U.S. Cl.
CPC ........... *F16H 55/06* (2013.01); *B29C 45/0025* (2013.01); *B29C 45/14491* (2013.01); *B29D 15/00* (2013.01); *F16H 55/17* (2013.01); *B29C 45/2669* (2013.01); *B29C 47/0009* (2013.01); *B29C 47/025* (2013.01); *B29C 2045/0027* (2013.01); *B29C 2045/2671* (2013.01); *B29L 2015/003* (2013.01); *F16H 2055/065* (2013.01); *Y10T 74/1987* (2015.01)

(58) Field of Classification Search
CPC ........ B29C 47/00; B29C 39/00; B29C 45/00
USPC .......... 74/434, 438, 108, 457, 461; 29/893.3
See application file for complete search history.

(56) References Cited

U.S. PATENT DOCUMENTS 1,828,271 A * 10/1931 Arnold .......................... 164/104
3,750,489 A * 8/1973 Caldwell ......................... 74/434
(Continued)

FOREIGN PATENT DOCUMENTS

CN        I01016944 A     4/2007
DE          2228572         1/1973
(Continued)

OTHER PUBLICATIONS

German Pat. Appln. Serial No. DE 10 2010 018 079.3 Office Action dated Jul. 18, 2011, 7 pages (German), 4 pages (English translation).
(Continued)

*Primary Examiner* — William Kelleher
*Assistant Examiner* — Zakaria Elahmadi
(74) *Attorney, Agent, or Firm* — Andrew F. Young, Esq.; Lackenbach Siegel, LLP

(57) ABSTRACT

The present invention is directed to a shaft with two front sides and an axis of rotation, whereby the shaft comprises at least one gear with the same axis of rotation, which gear borders at least a first one of the front sides in an axial area. Viewed from radially inside toward radially outside, the gear comprises a connection part with a central receptacle for the shaft, and an outer part with teeth. The connection part is cast directly between the shaft and the outer part. The connection part extends over the shaft in axial direction and covers the first front side.

13 Claims, 2 Drawing Sheets

(51) Int. Cl.
*B29C 45/14* (2006.01)
*B29D 15/00* (2006.01)
B29C 45/26 (2006.01)
B29C 47/02 (2006.01)
B29L 15/00 (2006.01)
B29C 47/00 (2006.01)

(56) References Cited

U.S. PATENT DOCUMENTS

| | | | |
|---|---|---|---|
| 6,981,324 B2 * | 1/2006 | Prucher | 29/893.34 |
| 7,117,598 B2 * | 10/2006 | Prucher | 29/893.2 |
| 7,155,824 B2 * | 1/2007 | Prucher | 29/893.1 |
| 7,498,683 B2 * | 3/2009 | Landwehr | 290/43 |
| 2002/0017153 A1 * | 2/2002 | Sakamaki | 74/434 |
| 2003/0131678 A1 * | 7/2003 | Noguchi et al. | 74/434 |
| 2004/0194566 A1 * | 10/2004 | Takayama | 74/434 |
| 2006/0236541 A1 * | 10/2006 | Prucher | 29/893.34 |
| 2008/0016974 A1 * | 1/2008 | Watanabe | 74/438 |
| 2008/0141812 A1 * | 6/2008 | Okabe | 74/434 |
| 2010/0101350 A1 * | 4/2010 | Hawighorst | 74/434 |
| 2010/0132495 A1 * | 6/2010 | Bernier | 74/434 |
| 2010/0307273 A1 * | 12/2010 | Adcock et al. | 74/434 |
| 2011/0011195 A1 * | 1/2011 | Oberle | 74/434 |
| 2011/0290054 A1 * | 12/2011 | Whitman et al. | 74/434 |
| 2012/0216645 A1 * | 8/2012 | Tanaka et al. | 74/434 |

FOREIGN PATENT DOCUMENTS

| | | | | |
|---|---|---|---|---|
| DE | 3244621 | | 6/1984 | |
| DE | 10 2004 061 090 | | 9/2006 | |
| DE | 10 2006 026 568 | | 12/2007 | |
| EP | 1 777 439 B1 | | 10/2006 | |
| EP | 1777429 | | 4/2007 | |
| GB | 1 057 627 | | 8/1980 | |
| GB | 2 057 627 A | | 8/1980 | |
| JP | H04-75266 | * | 11/1990 | F16H 55/06 |
| JP | H0475266 | | 6/1992 | |
| JP | 7-38754 Y2 | | 6/1995 | |
| JP | 2003021224 | | 1/2003 | |
| WO | WO 97/37147 | | 10/1997 | |
| WO | WO 2006/077817 | | 1/2006 | |

OTHER PUBLICATIONS

German Pat. Appln. Serial No. DE 10 2010 018 079.3, Office Action issued on Nov. 11, 2010, 4 pages, English translation, 5 pages.
Chinese Patent Appln. No. 2011 1009 4304.5 Office Action mailed Nov. 15, 2014, 9 pages—English; 7 pages—Chinese.

* cited by examiner

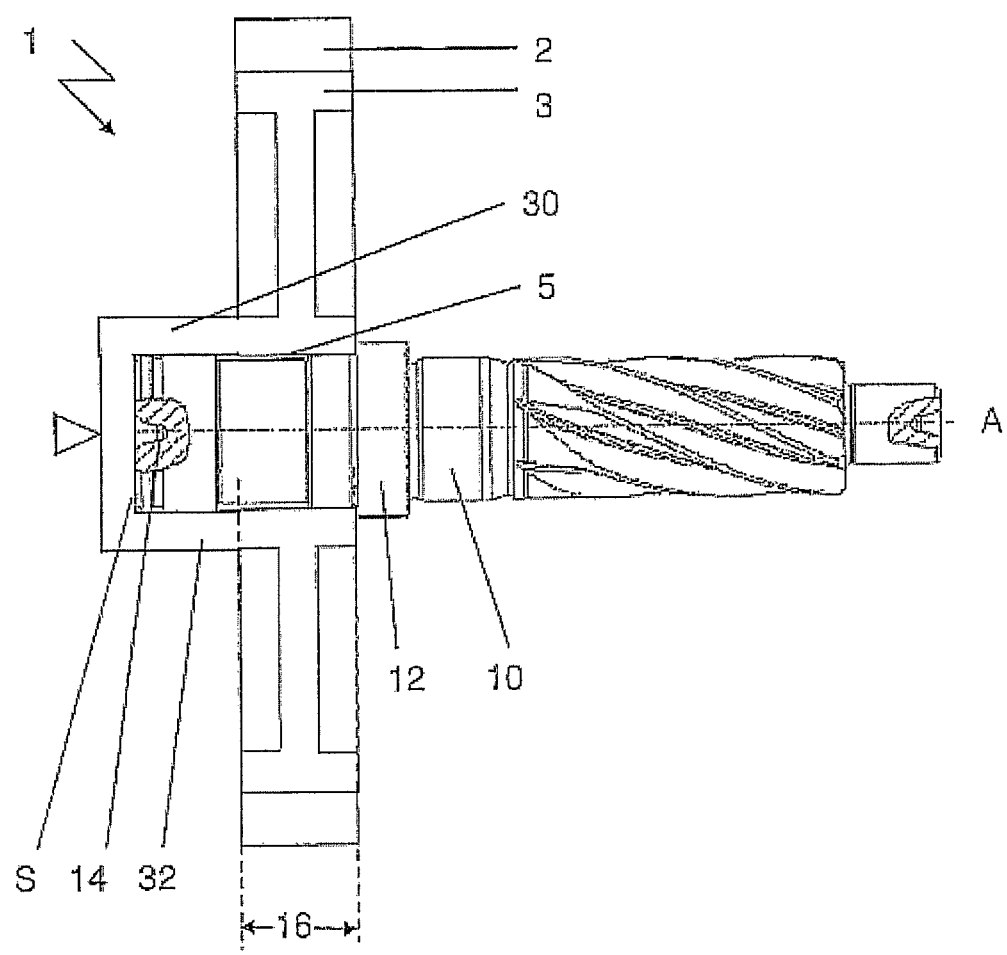

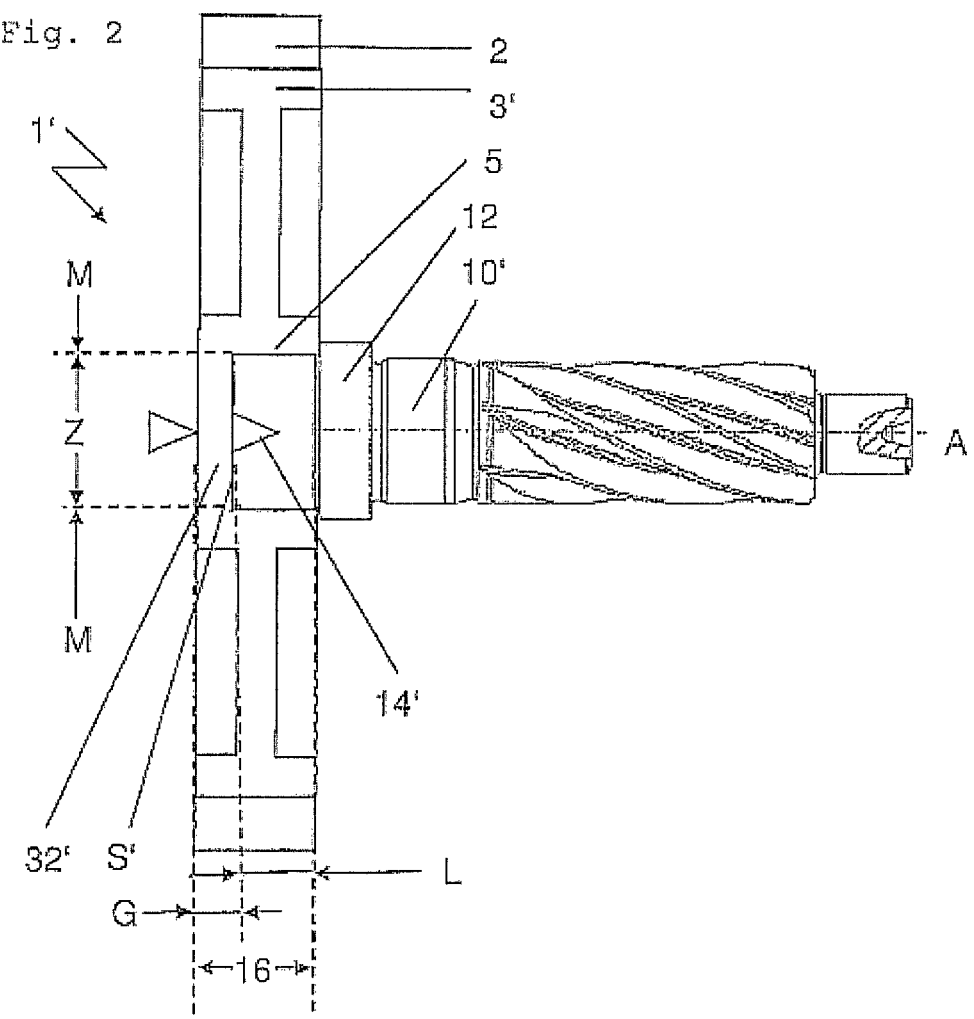

SHAFT WITH A GEAR CAST ON ITS FRONT SIDE AND METHOD FOR PRODUCING SUCH A SHAFT

CROSS REFERENCE TO RELATED APPLICATIONS

This application claims priority from German Patent Application Serial No. 10 2010 018 079.3, filed Apr. 22, 2010, the entire contents of which is herein incorporated fully by reference.

FIGURE FOR PUBLICATION

FIG. 2.

BACKGROUND OF THE INVENTION

1. Field of the Invention

The present invention relates to a shaft with a gear fastened thereon. More specifically, the present invention relates to a shaft with a gear on its front side and the method for producing such a shaft. The shaft being of a type that can be utilized within the automobile arts.

2. Description of the Related Art

The related art involves, for example, the powering steering art where so-called EPAS gears (EPAS: Electric Power-Assisted Steering) are known that are fastened on shafts Such gears comprise a ring that is adhered, for example, to a large metallic hub. Subsequently, a machine-cogged gear rim is formed in the outside of the ring.

Alternatively, gears are known in which a gear contour is injection-molded directly onto a large steel hub. A "large steel hub or metallic hub" denotes here a hub that is larger than one half the diameter of the gear formed in such a manner. Such hubs can finally be arranged on shafts, in particular on or adjacent to the front sides of the shafts.

For example, such a gear can be constructed with an outer part, an insert part, and with a connection part for a positive connection of the outer part and the insert part, whereby the connection part consists of material cast between the outer part and the insert part. The insert part is, for example, a hub to be arranged on a shaft or a shaft pin.

Furthermore, the injection-molding of transmission gears directly onto shafts is known, but, without the above-cited hubs. An appropriate method for producing a transmission gear on a shaft can be gathered from DE 10 2004 061 090 A1. However, such transmission gears are not the above-cited EPAS gears.

What is not appreciated by the prior art is efficiency to be obtained through simplification of an EPAS gear design, in particular the assembly of an EPAS on a shaft, and developing an associated production process that is economical, yet efficient.

This problem is solved with a shaft with a gear, in particular with an EPAS gear, cast on its front side. Specifically, the problem is addressed with the features of a shaft with two front sides and an axis of rotation, wherein the shaft comprises at least one gear with the same axis of rotation; and, wherein the gear borders at least a first one of the front sides in an axial area.

Accordingly, there is a need for an improved gear and of designing associated production processes, in particular the assembly of an EPAS gear on a shaft, more economically.

ASPECTS AND SUMMARY OF THE INVENTION

An aspect of the present invention is to provide a shaft having two front to sides opposing one another along its axis of rotation. The shaft has an axial area bordering at least one of the front sides in which area a gear, in particular an EPAS gear, is arranged coaxially to the shaft. The gear can be seated completely, that is, over its entire axial length, on the shaft. Alternatively, the gear projects over the shaft on the front side so that the axial area of the shaft is smaller than the actual width of the gear.

The gear comprises—viewed radially outward from the shaft received radially inward—a connection part with a central receptacle for the shaft and an outer part with teeth. The teeth face radially outward and are arranged distributed over the circumference of the outer part. The connection part is cast directly between the shaft and the outer part. This preferably takes place with a central longitudinal casting, in particular with a fan gate.

The connection part covers the shaft on the front side, i.e., on at least one of the front sides, with a cap. The cap can be considered as a component of the connection part because the cap is formed with the connection part in a continuous casting. Even if the entire gear does not extend axially over the corresponding front side of the shaft, at least the connection part does in a central area with the formed-on cap.

The front side off the shaft is completely covered according to an advantageous embodiment. Thus, a cap covering the particular front side of the shaft is advantageously formed that can be produced in one piece with the connection part during the central longitudinal casting. This eliminates a machining removal of a casting following the production method since the casting can remain as a cap. Especially economical production methods result.

The casting remaining on the shaft in the form of the cap protects the front side of the shaft from contamination and corrosion.

A pressing-on of a traditional spiral-toothed gear wheel or of a hub with a formed-on gear onto a shaft is often associated with inaccuracies regarding the resulting true running of the gear. An optimal roundness of the gear, relative to the shaft, can be achieved by the direct casting-on, in accordance with the invention, in particular by extrusion-coating with plastic.

The central longitudinal casting preferably used for the production method can be carried out in an appropriate casting apparatus in a space-saving manner over the free-standing shaft end.

According to an advantageous embodiment, the connection part comprises, in a central area along the axis of rotation adjacent to one another: a receiving section facing an axial middle of the shaft; and, a casting section facing away from the axial middle of the shaft.

The connection part supports the shaft in the receiving section. Alternatively, the shaft can carry a support for the gear in the receiving section. In the casting section, the connection part (as already described hereinabove) is constructed as a cap and covers the particular front side of the shaft.

The reception of the front side section of the shaft in the central area, and the front side covering of the shaft by a cap, are achieved in accordance with the invention by extrusion coating with plastic.

According to an advantageous embodiment, the connection part is in direct contact in the receiving section with the rotatable shaft, so that the shaft is supported axially, radially, and in a rotationally fixed manner. To this end, the shaft can be designed to be grooved in the axial area in which the gear is arranged; in particular, it can have elevations and recesses. Furthermore, in advantageous embodiments, circumferential grooves or circumferential collars are provided on the shaft for receiving cast material in or for supporting the gear on the shaft. With circumferential grooves, an especially advantageous material flow is also made possible in addition to support in axial direction.

In an especially advantageous embodiment, a surface of the connection part is present wherein the surface faces away from the shaft in an axial direction and is closed past a central area in radial direction. This surface runs substantially parallel, or precisely parallel, to the particular front side of the shaft so that the cap closes the front side radially inward in the connection part as a disk. In the central part, centrally cast material flows outward in a radial direction quasi-parallel to the front side to the outer part during the production method. This achieves an especially compact construction of the gear closed on the front side.

A surface of the cap which surface faces away from the particular front side of the shaft can also be constructed, alternatively to a level shape, with grooves, patterns, concavely, or convexly.

A method for producing such a shaft, with such a gear to be arranged on the front side on the shaft, comprises at least the successive method steps of: making the shaft in the outer part of the gear available; coaxially aligning the shaft and the outer part, relative to one another, so that they have a common axis of rotation; and, central casting of the connection part of the gear between the outer part and the shaft in a front-side, axial section of the shaft, with a casting that extends past the front side. The casting, which is aligned at first in axial direction, strikes against the front side off the shaft. A distribution in radial direction follows according to a rebound flow of the cast material. The shaft is extrusion-coated with plastic in an especially advantageous manner. The material penetrates into the area between the shaft and the outer part of the gear, so that the connection part is produced. The front side remains at least partially covered by the material.

A front-side gear can be produced by this method that covers the front side of the shaft. A central casting can be carried out in an especially advantageous manner as an economical production method without re-workings being necessary because the casting remains preserved as a cap. A subsequent turning or milling of the casting is eliminated.

In an advantageous embodiment, it is provided that a central hole is notched into the particular front side of the shaft at the beginning. Existing centering bores in the front sides of the shaft can be used. In addition, existing centering bores can be widened until the front-side hole has the desired size.

In central casting methods, in particular fan gate methods, a plug, in particular in the form of a cone, forms between two production runs in a nozzle of the casting or injection apparatus. The plug is transported in accordance with a suggested method at the start of the casting out of the nozzle in the direction of the front side. There—in the hole—the plug is caught. If the plug would, instead of being caught, be transported with a rebound flow radially outward into the area between the shaft and the outer part, the plug would come to rest at another position of the connection part and weaken the later cast part. In order to prevent this, the central, front-side hole is constructed in an especially advantageous manner as a plug catcher. As such, it is adapted to the shape of the plug in order to be able to reliably receive it.

The above, and other aspects, features and advantages of the present invention will become apparent from the following description read in conjunction with the accompanying drawings, in which like reference numerals designate the same elements.

BRIEF DESCRIPTION OF THE DRAWINGS

FIG. 1 shows a schematic view of a shaft with a front-side gear in accordance with a first exemplary embodiment, whereby the gear is shown in axial section.

FIG. 2 shows a schematic view of a shaft with a front-side gear in accordance with a second exemplary embodiment, whereby the gear is shown in axial section.

DETAILED DESCRIPTION OF THE PREFERRED EMBODIMENTS

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

FIGS. 1 and 2 show a shaft 10, 10' with a front side S, S'. A gear 1, 1' is arranged in an axial area 16 on shaft 10, 10' relative to front side S, S'. Front side S, S' can be located inside, or be located outside, axial section 16, axially distanced from axial area 16. Thus, shaft 10, 10' penetrates gear 1, 1', completely or partially.

In accordance with the numerous arrangement possibilities, FIG. 1 shows, by way of example, a first exemplary embodiment in the shape of shaft 10 completely penetrating gear 1; and, in FIG. 2, a second exemplary embodiment in the shape of shaft 10' partially penetrating gear P.

In FIG. 1, gear 1 is schematically sketched as an axial section shown on shaft 10 in perspective. Viewed from radially inside to radially outside, gear 1 comprises a connection part 3 and an outer part 2. Connection 3 has a central receptacle 5 for shaft 10. However, part 2 comprises teeth distributed over its circumference that are not shown in detail in FIG. 1.

Connection part 3 is cast directly between shaft 10 and outer part 2 and consists in particular of plastic. A reinforcement of the material of connection part 3 of the fibers, in particular glass fibers, is possible. A central casting in the direction of axis of rotation "A" is indicated in FIG. 1 with a front-side triangle. The form of a triangle is selected because the exit of a corresponding nozzle has such a conical form as a rule. The casting or the cast material rebounds on front side S of shaft 10 and is distributed parallel to front side S in all radial directions radially outward in the direction of the outer part.

A central casting, as indicated by the triangle, is preferably realized by a fan gate. For this, an injection molding apparatus is provided in which outer part 2 and shaft 10 are arranged coaxially to one another and material conducted centrally in axial direction toward the shaft flows around front side S until the material reaches outer part 2.

A throughhole 14 is present in shaft 10 on the front side. Throughhole 14 is provided, conditioned by the manufacture, in shaft 10 or subsequently introduced into front side S of shaft 10 as a centering receptacle in order to catch a plug from the casting apparatus.

Material grows cold in the nozzle of the casting apparatus between the manufacture of several shafts 10 and forms a plug whose shape also usually corresponds to a cone. At the beginning of casting C of connection part 3 this plug is caught by throughhole 14 and remains in the hole while material exiting behind the plug can be conducted into connection part 3.

A casting 30, remaining after the extrusion coating of shaft 10 or after the central casting, covers front side S of shaft 10. Thus, in the case of the first exemplary embodiment, a U-shaped cap 32 is produced by casting 30, the casing-shaped wall of which cap parallel to axis of rotation "A" bridges a certain distance up to area 16 in which the actual gear rests on shaft 10.

This cap 32 would usually be removed in a further method step. To this end shaft 10 would be clamped in a turning machine again so that cap 32 or casting 30 can be turned there with the result that front side S would be free again. This subsequent working is avoided by the design of the cap in accordance with the invention.

The second exemplary embodiment, according to FIG. 2, also comprises a cap 32' of a connection part 3' which cap covers front side S' of shaft 10' in a similar manner. However, shaft 10' penetrates gear 1' only partially. The front side is located in a direction along axis of rotation "A", thus, inside section 16.

The second exemplary embodiment is therefore designed more compactly, because the construction space in axial direction is smaller and there is nevertheless a complete covering of front side S'.

In addition, in distinction to cap 32 of the first exemplary embodiment, cap 32' of the second exemplary embodiment is not U-shaped or cup-shaped but rather is designed as a disk. The width of cap 32' corresponds to a partial section of area 16 and determines a minimal casting section G.

Casting section G is followed by front side S' and by receiving section L following inside section 16.

Shaft 10' also comprises a central hole 14' in its front side S' that is comparable to hole 14 of the first exemplary embodiment. However, the meeting point of the casting and of the above-mentioned plug is located in the case of the second exemplary embodiment inside area 16.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A method for producing an Electronic Power-Assisted Steering (EPAS) gear casted shaft device for automobiles with a gear arranged in an axial area of at least a first front side of a shaft, wherein said gear is built up, viewed from radially inside toward radially outside, at least from a connection part and an outer part with teeth, said method comprising the steps of:
   (a) providing a shaft;
   (b) providing an outer part;
   (b1) providing a casting apparatus for casting a connection part, including a receiving section facing an axial middle of said shaft, and a casting section facing away from the axial middle of said shaft;
   (c) aligning said shaft and said outer part with one another so that their axes of rotation are identical to one another with said casting apparatus placed within said outer part and said shaft being placed inside the receiving section;
   (c1) fixing said first front side of said shaft with said receiving section by extrusion coating with plastic; and
   (d) casting, centrally from said casting section, said connection part in a front-side, axial section of said shaft, with a casting extending past at least one of said first and said second front sides so that said connection part forms a cap for said front side of said shaft, whereby material introduced by said casting flows in a radial direction between said outer part and said shaft and at least one of said first and said second front sides remains covered at least partially by said material,
   wherein said gear is directly casted upon said shaft and is configured in structure and said material for EPAS in an automobile, such that said material introduced by said casting into said gear remains in said radial direction inside said axial area which is defined by an axial length of said outer part; and
   wherein an axial length of any portion of said connection part is not greater than an axial length of any portion of said outer part such that material introduced into said gear remains in a radial direction inside an axial area which is defined by an axial length of said outer part and said connection part and said outer part are orientated in a direction towards each other; and
   wherein said shaft passes through said gear only in part as viewed in said axial direction.

2. The method according to claim 1, wherein said method, prior to said casting step, further comprises the step of notching a central, front-side throughhole into said shaft.

3. The method according to claim 2, wherein said central, front-side throughhole is adapted to a plug catcher with the shape of a plug that stems from a nozzle of a casting apparatus and is formed in particular like a cone.

4. The method according to claim 3, wherein said central, front-side throughhole is formed in the shape of a cone.

5. The method according to claim 2, wherein said connection part is manufactured by a fan gate.

6. The method according to claim 3, wherein said connection part is manufactured by a fan gate.

7. An Electronic Power-Assisted Steering (EPAS) gear casted shaft device, said shaft device further comprising:
   (a) a shaft having a first and a second front side and an axis of rotation;
   (b) at least one gear with said axis of rotation, wherein said at least one gear borders at least a first one of said first and said second front sides in an axial area, and wherein said gear, when viewed from radially inside toward radially outside, further comprises:

(i) a connection part having a central receptacle facing the axial middle of said shaft; and (ii) an outer part with a set of teeth; and wherein said first front side of said shaft and said central receptacle are fixed together by extrusion coating with plastic;

wherein said connection part is casted directly upon said first front side of said shaft between said shaft and said outer part;

wherein said connection part extends over said shaft in an axial direction and covers said first front side as a disk cap;

wherein said gear is configured for EPAS;

wherein an axial length of any portion of said connection part is not greater than an axial length of any portion of said outer part such that material introduced into said gear remains in a radial direction inside an axial area which is defined by an axial length of said outer part and said connection part and said outer part are orientated in a direction towards each other; and wherein said shaft passes through said gear only in part as viewed in said axial direction.

8. The shaft device according to claim 7, wherein said shaft penetrates said gear only partially, so that said first front side is located in a direction along said axis of rotation.

9. The shaft device according to claim 8, wherein said cap borders vertically to the axis of rotation radially outward and runs substantially parallel to the front side of said shaft.

10. The shaft device according to claim 8 wherein the width of said cap corresponds to a partial section of an area defined by the width of said connection part and determines a minimal casting section.

11. The shaft device according to claim 7, wherein a central throughhole is arranged in said first front side of said shaft, and wherein further said central throughhole is a rotationally symmetrical throughhole aligned coaxially to the axis of rotation.

12. The shaft device according to claim 11, wherein said central, frontside throughhole is adapted to a plug catcher with the shape of a plug that stems from a nozzle of a casting apparatus and is formed in particular like a cone.

13. The shaft device according to claim 7, wherein said casting section is followed by said second front side and by said central receptacle following inside said area defined by the width of said connection part and wherein further a meeting point of said casting section and of said plug is located inside said area.

* * * * *